US012787994B2

(12) United States Patent
Dalton et al.

(10) Patent No.: US 12,787,994 B2
(45) Date of Patent: Nov. 10, 2026

(54) FISHING POLE GRIP

(71) Applicant: AOB Products Company, Columbia, MO (US)

(72) Inventors: Mark Dalton, Columbia, MO (US); Dennis W. Cauley, Jr., Fayette, MO (US); Timothy S. Kinney, Warrenton, MO (US); James Tayon, Moberly, MO (US)

(73) Assignee: AOB Products Company, Columbia, MO (US)

(*) Notice: Subject to any disclaimer, the term of this patent is extended or adjusted under 35 U.S.C. 154(b) by 314 days.

(21) Appl. No.: 17/982,516

(22) Filed: Nov. 7, 2022

(65) Prior Publication Data

US 2023/0145014 A1 May 11, 2023

Related U.S. Application Data

(60) Provisional application No. 63/263,596, filed on Nov. 5, 2021.

(51) Int. Cl.

| | |
|---|---|
| ***A01K 87/08*** | (2006.01) |
| ***B32B 1/08*** | (2006.01) |
| ***B32B 5/02*** | (2006.01) |
| *B32B 7/12* | (2006.01) |
| *B32B 25/08* | (2006.01) |
| *B32B 25/10* | (2006.01) |
| *B32B 25/20* | (2006.01) |
| *B32B 27/08* | (2006.01) |
| *B32B 27/12* | (2006.01) |
| *B32B 27/32* | (2006.01) |

(52) U.S. Cl.

CPC ................ *A01K 87/08* (2013.01); *B32B 1/08* (2013.01); *B32B 5/02* (2013.01); *B32B 7/12* (2013.01); *B32B 25/08* (2013.01); *B32B 25/10* (2013.01); *B32B 25/20* (2013.01); *B32B 27/08* (2013.01); *B32B 27/12* (2013.01); *B32B 27/32* (2013.01); *B32B 2262/106* (2013.01); *B32B 2597/00* (2013.01)

(58) Field of Classification Search

CPC ......... A01K 87/08; A01K 87/00; A01K 87/06
USPC .......................................... 43/22, 23, 18.1 R
See application file for complete search history.

(56) References Cited

U.S. PATENT DOCUMENTS

| | | | | | | |
|---|---|---|---|---|---|---|
| D101,218 | S | | 9/1936 | Gurrieri | | |
| 3,466,783 | A | * | 9/1969 | Priebe, Jr. | A01K 87/00 | 43/18.5 |
| 4,334,378 | A | * | 6/1982 | Worth | A01K 87/08 | 43/22 |
| D265,496 | S | | 7/1982 | McMickle | | |
| 4,577,432 | A | * | 3/1986 | Brackett | A01K 87/08 | 43/18.1 R |
| 4,578,890 | A | * | 4/1986 | Childre | A01K 87/06 | 43/22 |

(Continued)

OTHER PUBLICATIONS

Four Images of Pliers and Knives, 4 pages, at least as early as May 3, 2021, admitted prior art.

(Continued)

*Primary Examiner* — William L Gmoser
(74) *Attorney, Agent, or Firm* — Stinson LLP

(57) ABSTRACT

Fishing pole grips and associated components and methods. The fishing pole grips can include a composite structure providing the grips with improved durability, performance, and appearance.

43 Claims, 15 Drawing Sheets

(56) References Cited

U.S. PATENT DOCUMENTS

| | | | | |
|---|---|---|---|---|
| D290,384 | S | 6/1987 | McNeil | |
| D290,385 | S | 6/1987 | McNeil | |
| D294,162 | S | 2/1988 | Andreasen et al. | |
| D299,735 | S | 2/1989 | Andraesen et al. | |
| D299,736 | S | 2/1989 | Andraesen et al. | |
| D300,551 | S | 4/1989 | Andraesen | |
| 5,245,779 | A * | 9/1993 | Suzue | D02G 3/444<br>428/377 |
| 5,721,030 | A * | 2/1998 | Okada | B32B 5/26<br>473/319 |
| 5,960,578 | A * | 10/1999 | Yasui | A01K 77/00<br>43/23 |
| 6,301,821 | B1 * | 10/2001 | Suzue | A01K 87/00<br>43/18.5 |
| D472,297 | S | 3/2003 | Hashimoto | |
| 6,709,347 | B1 * | 3/2004 | Ono | A63B 60/00<br>473/319 |
| 7,051,470 | B2 * | 5/2006 | Lybarger | A01K 87/007<br>43/18.1 R |
| D776,232 | S | 1/2017 | Shimizu et al. | |
| D793,195 | S | 8/2017 | Grass | |
| D852,314 | S | 6/2019 | Norsworthy | |
| 11,576,359 | B2 * | 2/2023 | Iwata | A01K 87/08 |
| 2014/0173967 | A1 * | 6/2014 | Iwata | A01K 87/08<br>43/18.1 R |
| 2014/0366327 | A1 * | 12/2014 | Huang | B25G 1/10<br>16/421 |
| 2021/0112796 | A1 | 4/2021 | Matsuda et al. | |

OTHER PUBLICATIONS

Tidal Pro Spinning posted Aug. 19, 2022 [online], [retrieved Aug. 19, 2023]. Retrieved from internet,https://www.bubba.com/rods/tidal-pro-spinning/1137598-Z.html (Date:2023) (Year: 2022).

Bubba TS761 MHF-S, posted Aug. 23, 2021 [online], [retrieved Aug. 19, 2023]. Retrieved from internet, https://www.amazon.com/TS761 MH F-S-Tidal-Select-Spinning-Rod/dp/B09DDDGM9P (Date:2023) (Year: 2021).

Bubba Tidal, posted Aug. 23, 2021 [online], [retrieved Aug. 19, 2023]. Retrieved from internet, https://www.amazon.com/dp/B09DDD1 P41/ref (Date:2023) (Year: 2021).

Active, posted Mar. 23, 2022 [online], [retrieved Dec. 6, 2024]. Retrieved from internet, https://www.activegearreview.com/watersports/ bubba-tidal-pro-spinning-rod-review/ (Date:2024) (Year: 2022).

Florida, posted Feb. 17, 2022 [online], [retrieved Dec. 6, 2024]. Retrieved from internet, https://www.floridasportsman.com/editorial/bubba-inshore-fishing-rods/457138#replay (Date:2024) (Year: 2022).

Fuji, posted Mar. 1, 2022 q[ online], [retrieved Dec. 6, 2024]. Retrieved from internet, https://web.archive.org/web/20220301014009/https://www.bubba.com/rods/tidal-pro-spinning/1137598-Z.html (Date:2024) (Year: 2022).

Tidal, posted Dec. 6, 2021 [online], [retrieved Dec. 6, 2024]. Retrieved from internet, https://www.bubba.com/rods/tidal-pro-spinning/ 1137598-Z.html#start=1 (Date:2024) (Year: 2021).

* cited by examiner

FISHING POLE GRIP

CROSS-REFERENCE TO RELATED APPLICATION

The present application claims priority to U.S. Provisional Patent App. No. 63/263,596, filed Nov. 5, 2021, the entirety of which is hereby incorporated by reference.

FIELD

The present disclosure generally relates to fishing equipment, and more particularly to fishing pole grips.

BACKGROUND

Various types of grips are used on fishing poles. Improvements are needed.

SUMMARY

In one aspect, a fishing pole grip comprises a fishing pole grip assembly. The fishing pole grip assembly includes a shell and an overmolded layer. The fishing pole grip subassembly has a proximal end portion, a distal end portion, and an intermediate portion therebetween. The shell includes a proximal shell component and a distal shell component. The proximal and distal shell components are formed separately and connected to form a joint between the proximal and distal shell components. The proximal and distal shell components form a substantially hourglass shape such that the fishing pole grip assembly has a generally hourglass shape wherein the proximal and distal end portions are wider than the intermediate portion. The overmolded layer overlies the shell.

In another aspect, a fishing pole grip comprises a fishing pole grip assembly including a shell, and overmolded layer, and a carbon fiber tube. The carbon fiber tube and overmolded layer overlie the shell and form a joint.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
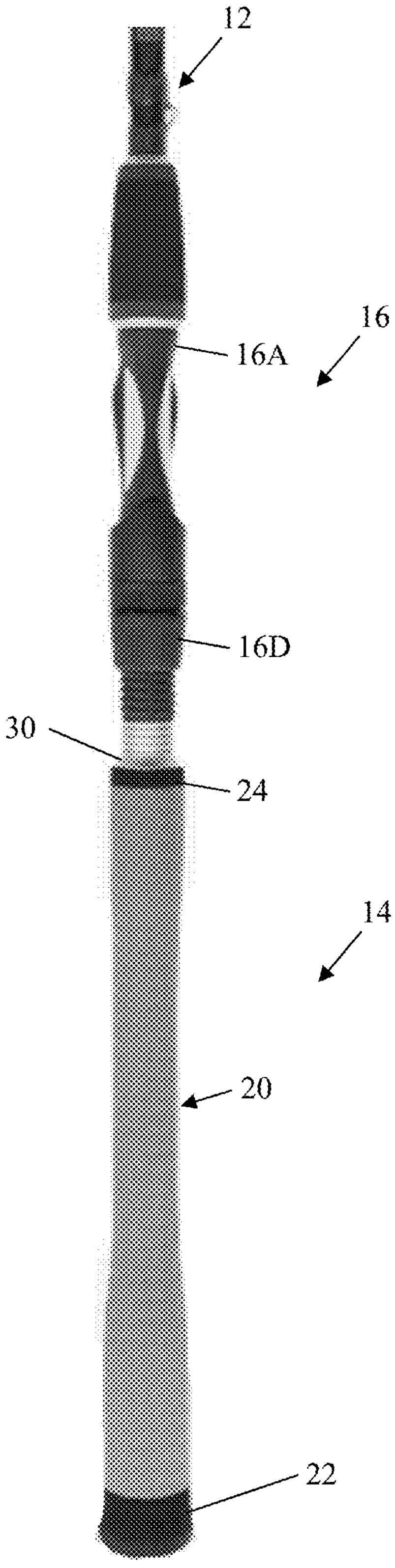
FIG. 1 is a fragmentary top view of a first fishing pole of the present disclosure.
Figure 2:
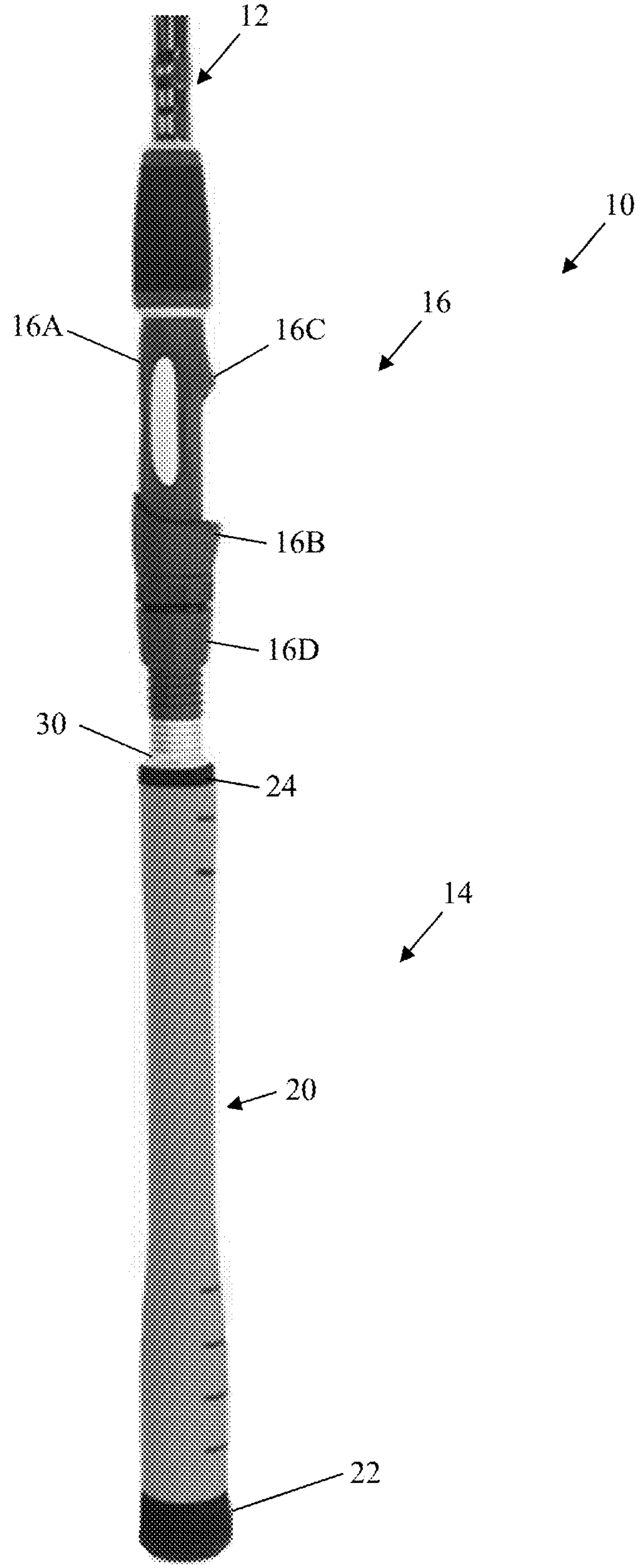
FIG. 2 is a fragmentary right elevation of the fishing pole of FIG. 1.

Referring to FIGS. 1 and 2, a first embodiment of a fishing pole (e.g., spinning rod) is indicated generally by 10. The fishing pole includes a shaft 12 (e.g., made of carbon fiber), a grip assembly 14, and a reel seat assembly 16. The grip assembly 14 and reel seat assembly 16 are installed on a proximal end portion of the shaft 12. It will be appreciated that only a segment of the shaft is shown. The shaft 12 has a length extending from the proximal end portion to a distal end portion and can include a plurality of line guides configured to support fishing line extending from a reel mounted on the reel seat assembly.

The fishing grip assembly 14 includes a proximal end located at the proximal end of the shaft and a distal end spaced distally along a length of the assembly from the proximal end. In the illustrated embodiment, the grip assembly includes a grip subassembly 20 and a proximal end segment 22 (e.g., proximal end plug or cap) and a distal end segment 24. The grip subassembly 20 can have a composite construction, as explained in further detail below. For example, the proximal end segment 22 and distal end segment 24 can be formed of EVA or another suitable material. The proximal and distal end segments 22, 24 close the ends of the grip subassembly 20. Optionally, EVA can be provided inside the grip subassembly 20 and extend from the proximal end segment 22 to the distal end segment 24. A reducer 30 is provided to reduce from the distal end segment 24 to a threaded portion of the reel seat assembly 16. Other configurations of grip subassemblies can be used without departing from the scope of the present disclosure.

The reel seat assembly 16 includes a reel seat body 16A supporting proximal and distal reel receivers 16B, 16C (e.g., hoods) configured to receive opposite end portions of a reel foot to mount the reel on the fishing pole. The distal reel receiver 16C is static with respect to the reel seat body 16A, and the proximal reel receiver 16B is movable with respect to the distal reel receiver to change a distance therebetween to permit installation of the reel foot. After the reel foot is installed in the distal receiver 16C, the proximal receiver 16B is moved distally to capture the reel foot. The proximal receiver 16B is moved by rotation of an actuator 16D (e.g., nut) having a threaded connection with the reel seat body 16A. Other configurations of reel seats can be used without departing from the scope of the present disclosure.

Figure 3:
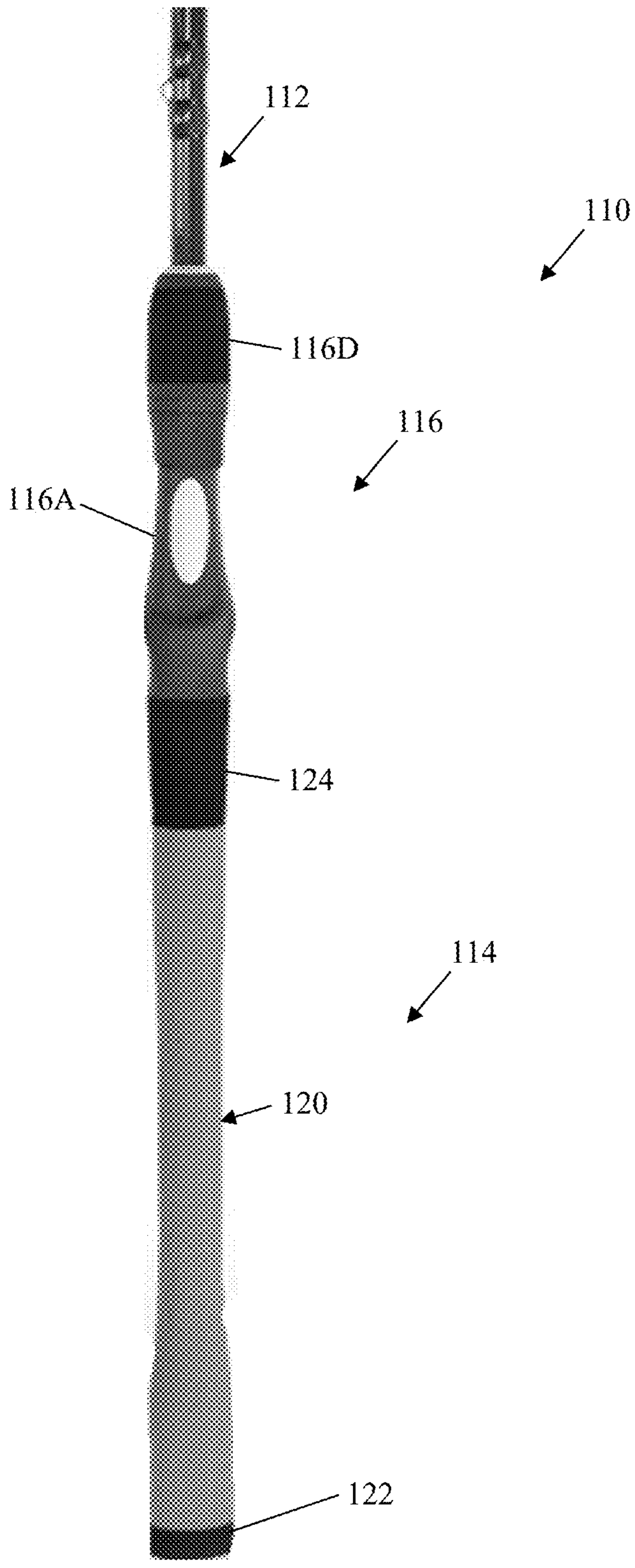
FIG. 3 is a fragmentary top view of a second fishing pole of the present disclosure.
Figure 4:
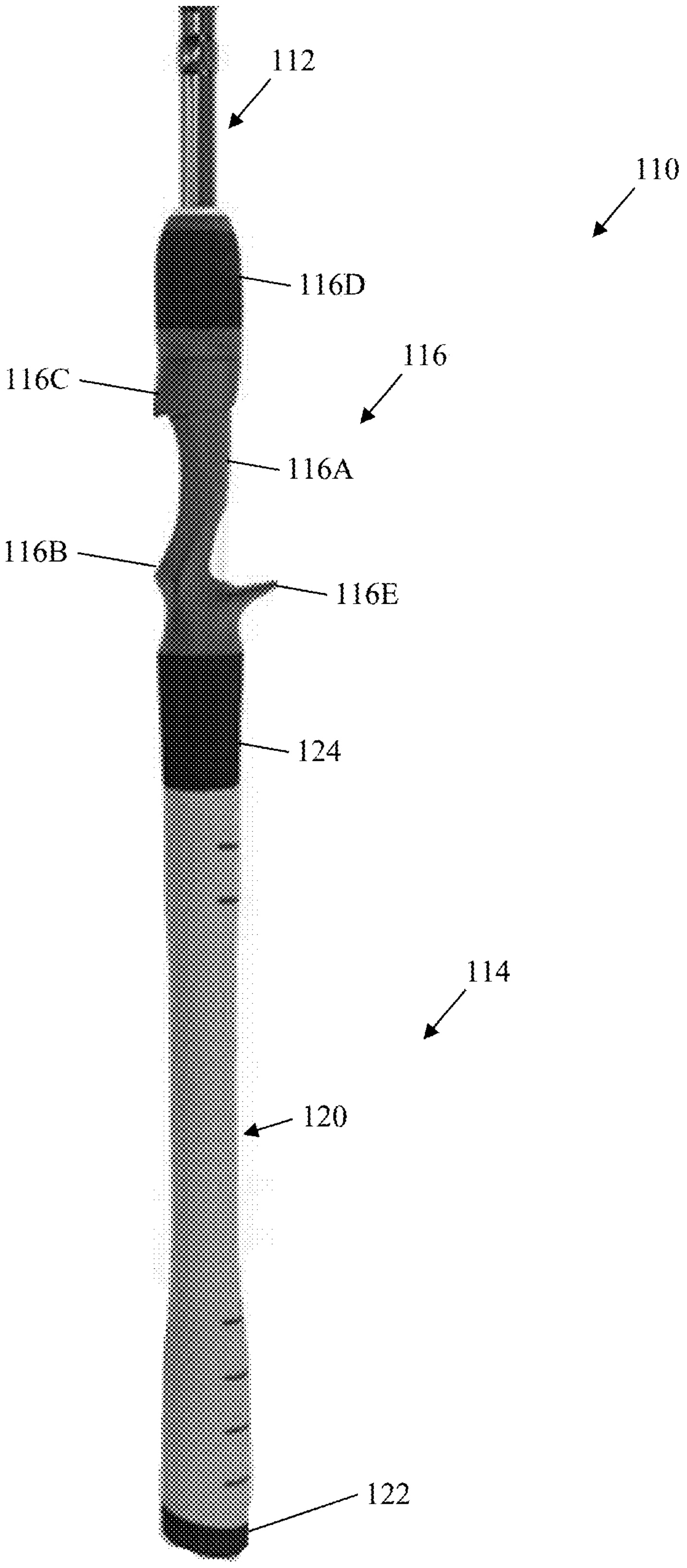
FIG. 4 is a fragmentary right elevation of the fishing pole of FIG. 2.

Referring to FIGS. 3 and 4, a second embodiment of a fishing pole (e.g., casting rod) is indicated generally by 110. The fishing pole is generally similar to the fishing pole 10 of FIGS. 1 and 2, and like components are indicated by like reference numbers, plus 100. For example, the fishing pole 110 includes a shaft 112 (e.g., made of carbon fiber), a grip assembly 114, and a reel seat assembly 116. The grip assembly 114 and reel seat assembly 116 are installed on a proximal end portion of the shaft 112.

The fishing grip assembly 114 includes a proximal end located at the proximal end of the shaft and a distal end spaced distally along a length of the assembly from the proximal end. The grip assembly 114 includes a grip subassembly 120, a proximal end segment 122 (e.g., proximal end plug or cap), and a distal end segment 124. The grip subassembly 120 can have the same construction as the first grip subassembly 20, which will be described in more detail below. The proximal end segment 122 and distal end segment 124 can be formed of EVA or another suitable material. The proximal and distal end segments 122, 124 close the ends of the grip subassembly 120. Optionally, EVA can be provided inside the grip subassembly 120 and extend from the proximal end segment 122 to the distal end segment 124. In this embodiment, the distal end segment 124 is longer and transitions to the reel seat assembly 116 without a reducer. Other configurations of grip subassemblies can be used without departing from the scope of the present disclosure.

The reel seat assembly 116 includes a reel seat body 116A supporting proximal and distal reel receivers 116B, 116C (e.g., hoods) configured to receive opposite end portions of a reel foot to mount the reel on the fishing pole. In this embodiment, the proximal reel receiver 116B is static with respect to the reel seat body 116A, and the distal reel receiver 116C is movable with respect to the proximal reel receiver to change a distance therebetween to permit installation of the reel foot. The distal receiver 116C is moved by rotation of an actuator 116D (e.g., nut) having a threaded connection with the reel seat body 116A. A finger rest 116E protrudes downward from the reel seat body 116A below the proximal reel receiver 116B. Other configurations of reel seats can be used without departing from the scope of the present disclosure.

Figure 5:
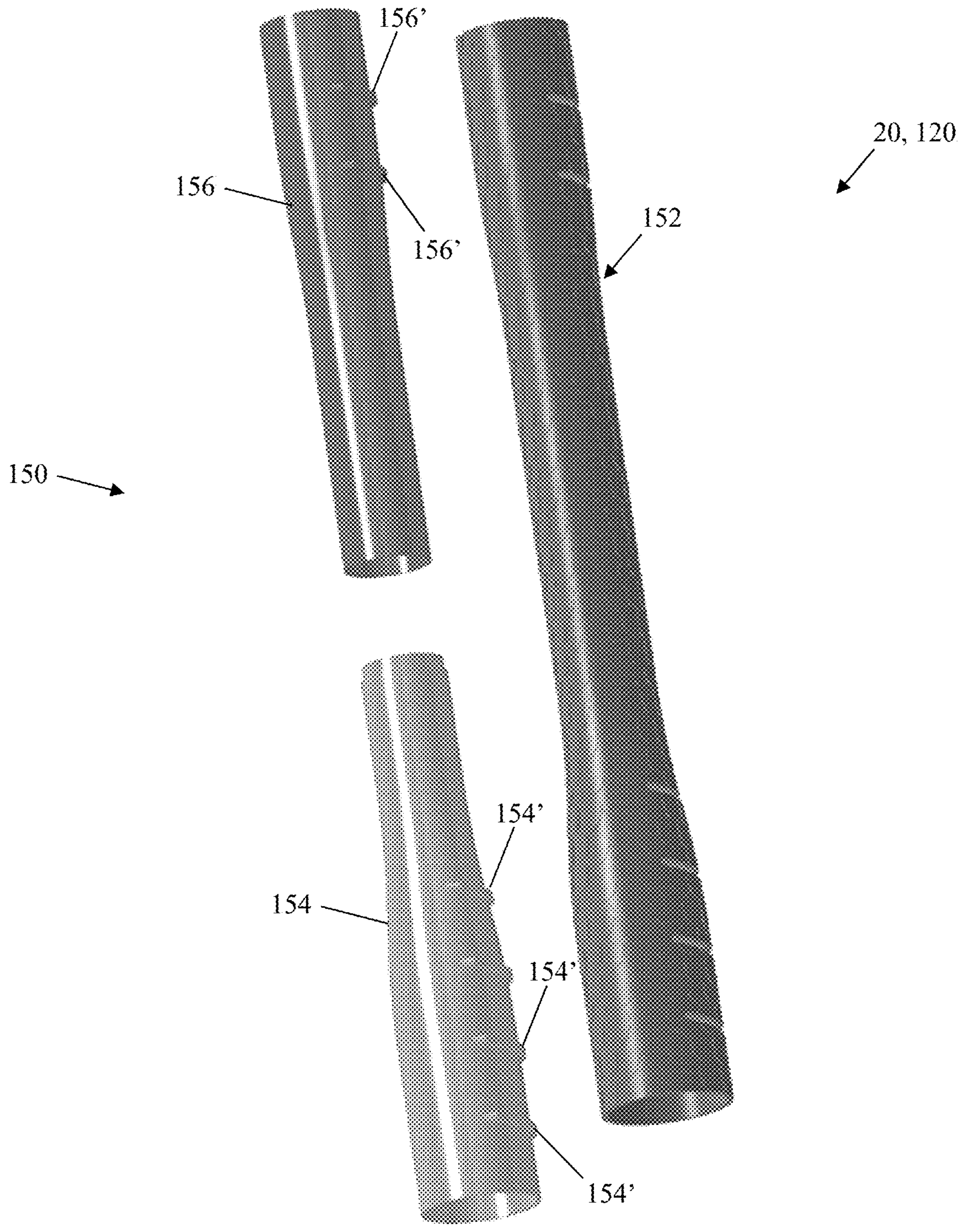
FIG. 5 is an exploded perspective of components used to manufacture fishing pole grips of the first and second fishing poles.
Figure 6:
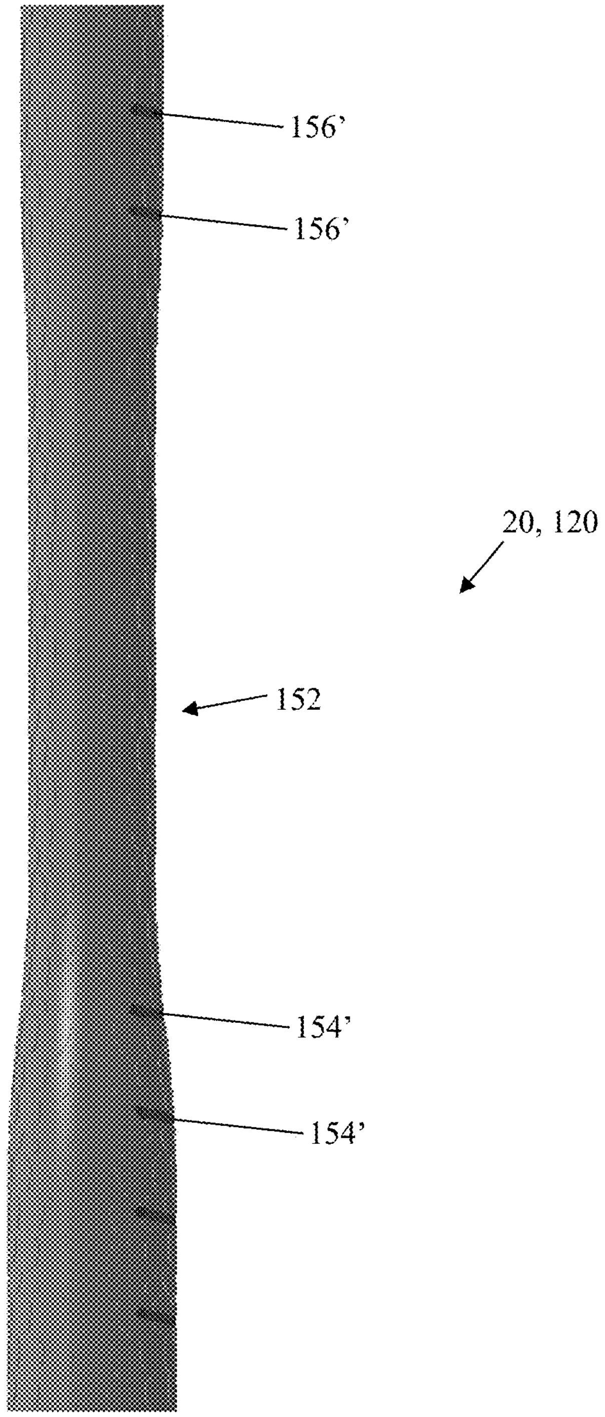
FIG. 6 is a side elevation of a fishing pole grip subassembly of the first and second fishing poles.
Figure 7:
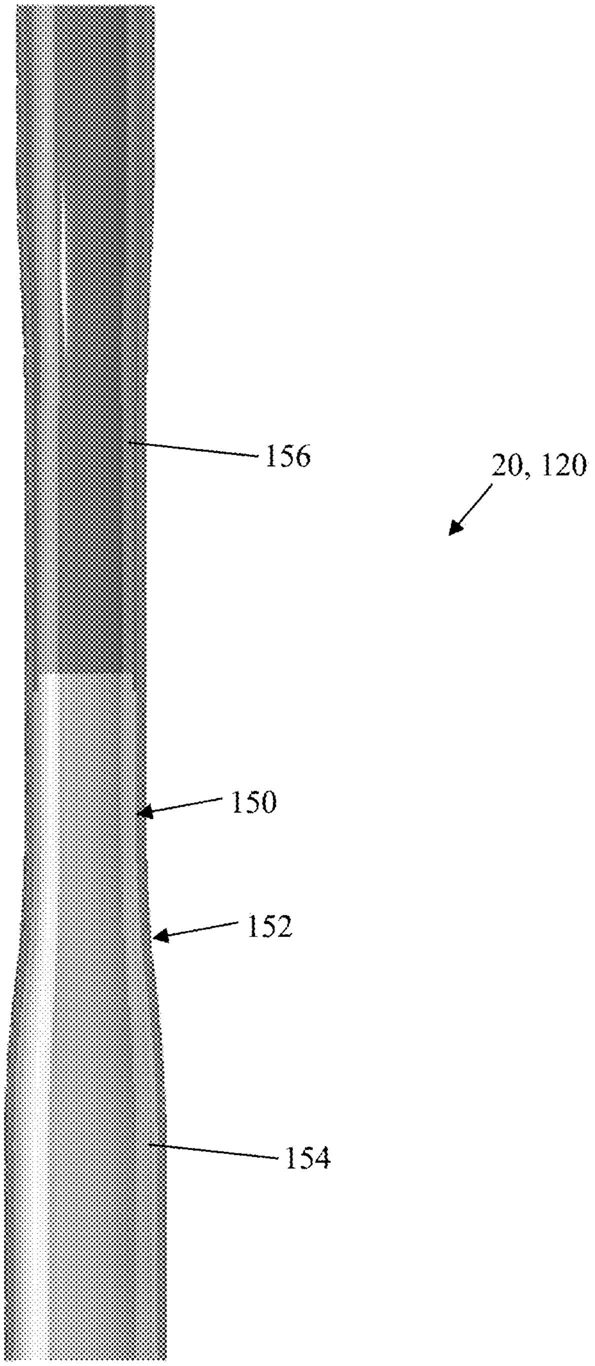
FIG. 7 is a section of the fishing pole grip subassembly of FIG. 6.

Referring now to FIGS. 5-7, the grip subassembly 20, 120 comprises an inner shell 150 and a cover 152 overlying the shell. In the illustrated embodiment, the cover 152 hides the inner shell 150 from view except for minor portions of the shell. The cover 152 can be formed by overmolding onto the shell 150. For example, a TPE material or silicone material can be overmolded onto the shell 150 to form the cover 152.

Referring to FIG. 5, the shell 150 includes two shell portions 154, 156. Each shell portion 154, 156 is tubular. The shell portions 154, 156 can be formed of plastic (e.g., injection molded polymer) or another suitable material. The first shell portion 154 forms a proximal part of the shell 150, and the second shell portion 156 forms a distal part of the shell. The first shell portion 154 includes a reduced diameter segment at its distal end configured to be received in a proximal opening of the second shell portion 156 for connecting the two shell portions. For example, adhesive or another type of bonding can be used to connect the shell portions. In the illustrated embodiment, the first shell portion 154 tapers such that it has a smaller distal end than proximal end. Moreover, the second shell portion 156 tapers such that it has a smaller proximal end than distal end. When the shell portions 154, 156 are connected, the shell 150 has a generally hourglass shape (smaller diameter intermediate segment). The shell 150 is formed of the two portions 154, 156 to facilitate injection molding of the parts to provide this hourglass shape. In the illustrated embodiment, the shell portions 154, 156 include ribs 154', 156' (broadly "protrusions") that extend outward from outer surfaces of main tubular bodies of the shell portions. When the cover 152 is molded over the shell, the protrusions 154', 156' are exposed through openings in the cover. The protrusions assist in maintaining a position of the cover on the shell. Desirably, the cover has an outer texture (e.g., "gator skin" texture) promoting friction and facilitating gripping of the grip assembly.

The proximal and distal end segments 22, 24, 122, 124 can be assembled with the grip subassembly 20 before, after, or during installation of the grip components on the shaft 12, 112. In one example, the grip assembly 114 (comprising the shell 150, cover 152, end segments 22, 24, 122, 124) is installed onto a shaft 112 or rod blank together. When the shell is received on the shaft, the shell can be filled with a filler such as an expanding foam or other material (e.g., EVA) or mounting component(s) to fill an annular space between the shell and the shaft. Other configurations can be used without departing from the scope of the present disclosure.

Figure 8:
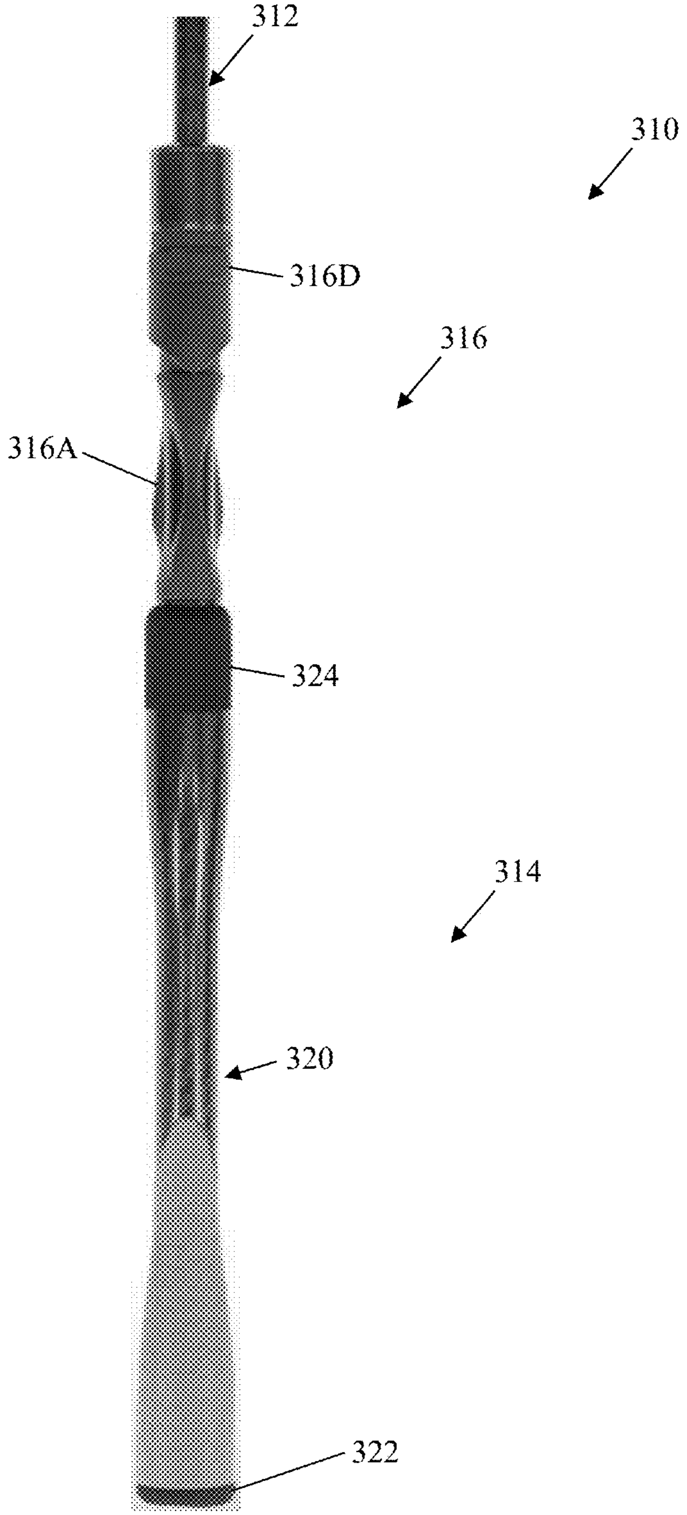
FIG. 8 is a fragmentary top view of a third fishing pole of the present disclosure.
Figure 9:
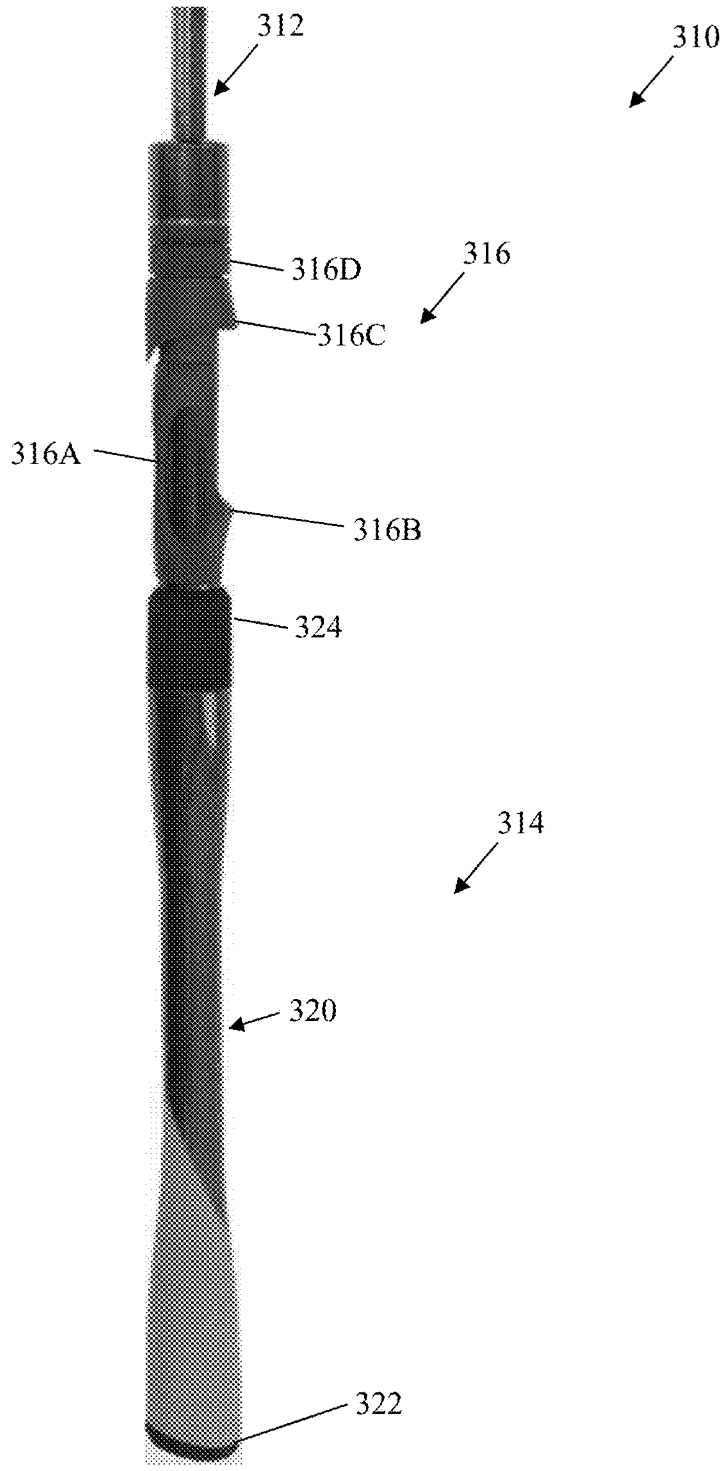
FIG. 9 is a fragmentary right elevation of the fishing pole of FIG. 8.

Referring to FIGS. 8 and 9, a third embodiment of a fishing pole (e.g., spinning rod) is indicated generally by 310. The fishing pole includes a shaft 312 (e.g., made of carbon fiber), a grip assembly 314, and a reel seat assembly 316. The grip assembly 314 and reel seat assembly 316 are installed on a proximal end portion of the shaft 312. It will be appreciated that only a segment of the shaft is shown. The shaft 312 has a length extending from the proximal end portion to a distal end portion and can include a plurality of line guides configured to support fishing line extending from a reel mounted on the reel seat assembly.

The fishing grip assembly includes a proximal end located at the proximal end of the shaft and a distal end spaced distally along a length of the assembly from the proximal end. In the illustrated embodiment, the grip assembly 314 includes a grip subassembly 320 and a proximal end segment 322 (e.g., proximal end plug or cap) and a distal end segment 324. The grip subassembly 320 can have a composite construction, as explained in further detail below. For example, the proximal end segment 322 and distal end segment 324 can be formed of EVA or another suitable material. The proximal and distal end segments 322, 324 close the ends of the grip subassembly 320. Optionally, EVA can be provided inside the grip subassembly 320 and extend from the proximal end segment 322 to the distal end segment 324. Other configurations of grip subassemblies can be used without departing from the scope of the present disclosure.

The reel seat assembly 316 includes a reel seat body 316A supporting proximal and distal reel receivers 316B, 316C (e.g., hoods) configured to receive opposite end portions of a reel foot to mount the reel on the fishing pole. The proximal reel receiver 316B is static with respect to the reel seat body 316A, and the distal reel receiver 316C is movable with respect to the proximal reel receiver 316B to change a distance therebetween to permit installation of the reel foot. After the reel foot is installed in the proximal receiver 316B, the distal receiver 316C is moved distally to capture the reel foot. The distal receiver 316C is moved by rotation of an actuator 316D (e.g., nut) having a threaded connection with the reel seat body 316A. Other configurations of reel seats can be used without departing from the scope of the present disclosure.

Figure 10:
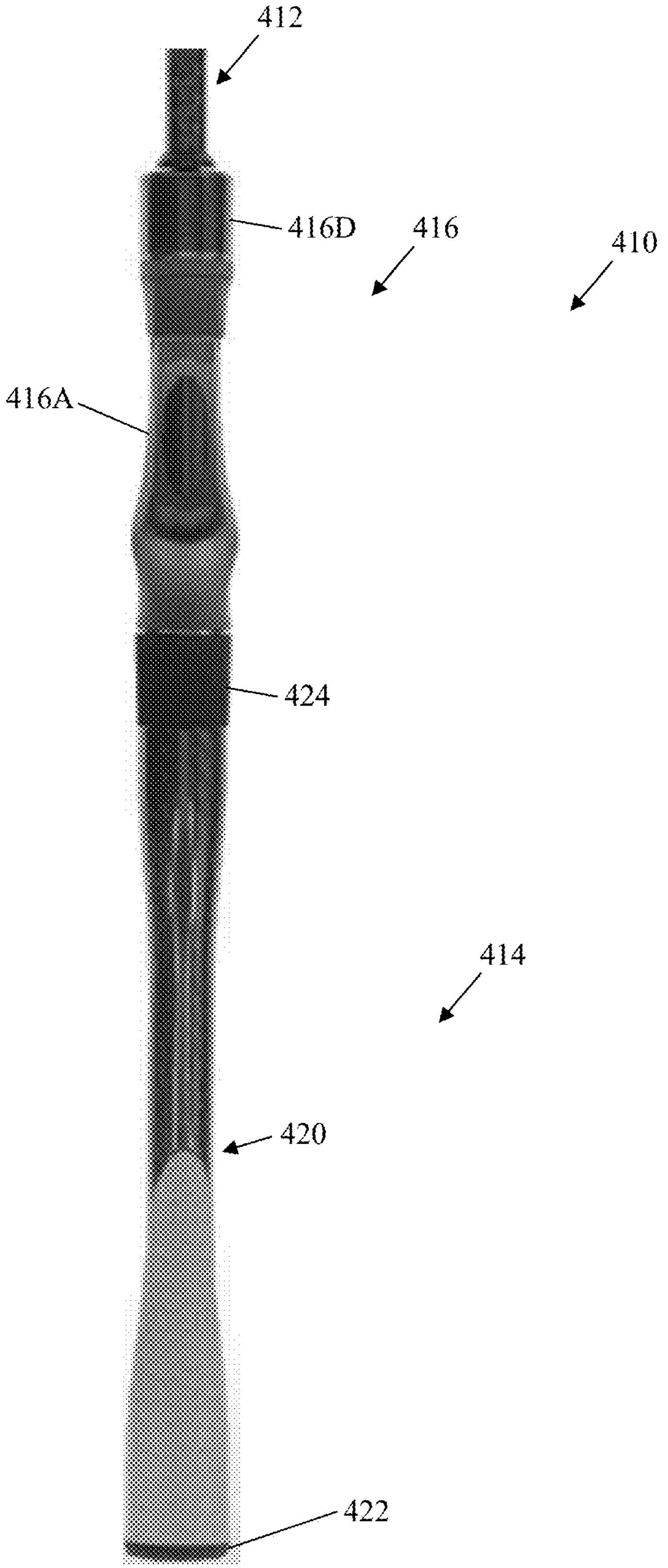
FIG. 10 is a fragmentary top view of a fourth fishing pole of the present disclosure.
Figure 11:
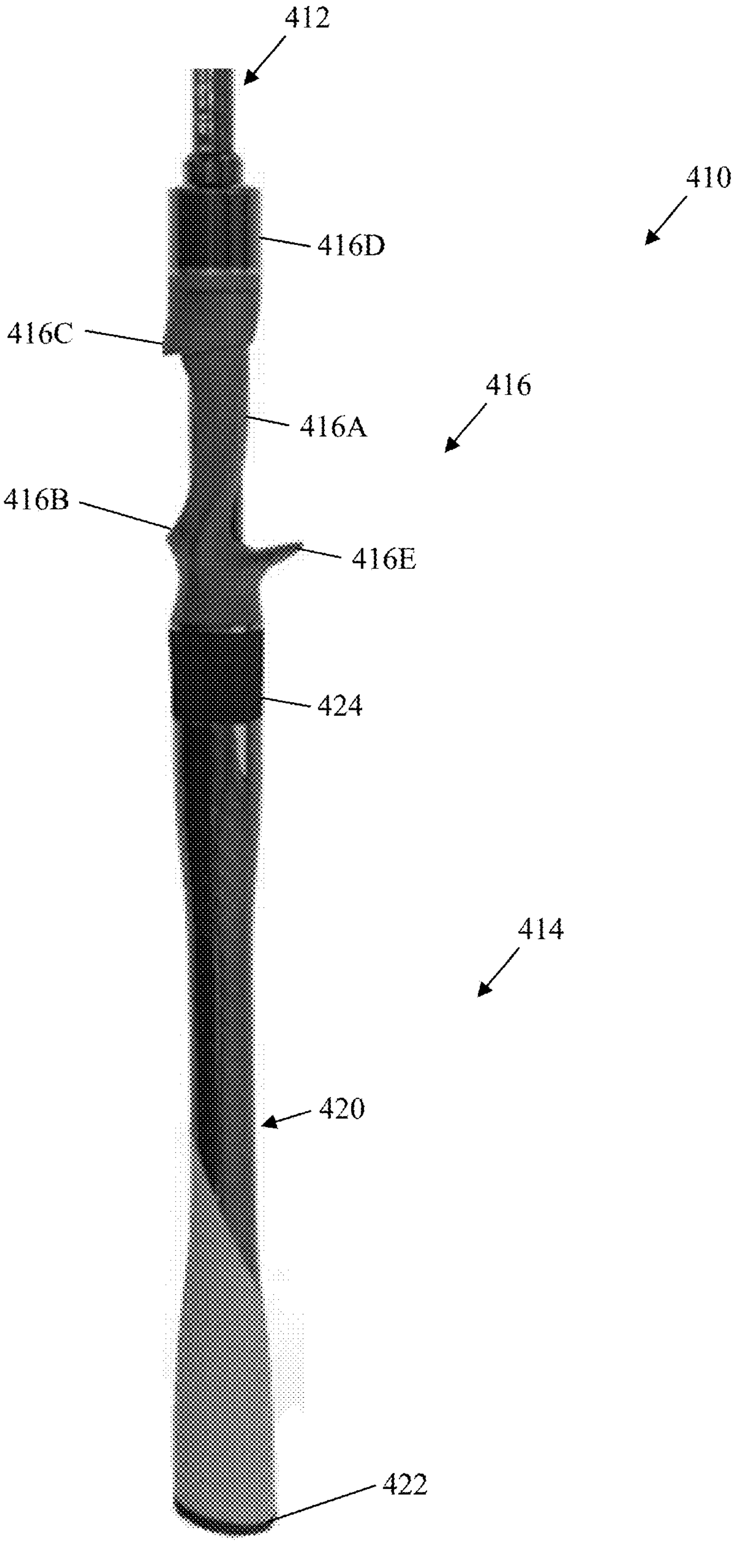
FIG. 11 is a fragmentary right elevation of the fishing pole of FIG. 10.

Referring to FIGS. 10 and 11, a fourth embodiment of a fishing pole (e.g., casting rod) is indicated generally by 410. The fishing pole 410 is generally similar to the fishing pole 310 of FIGS. 8 and 9, and like components are indicated by like reference numbers, plus 100. For example, the fishing pole 410 includes a shaft 412 (e.g., made of carbon fiber), a grip assembly 414, and a reel seat assembly 416. The grip assembly 414 and reel seat assembly 416 are installed on a proximal end portion of the shaft 412.

The fishing grip assembly 414 includes a proximal end located at the proximal end of the shaft 412 and a distal end spaced distally along a length of the assembly from the proximal end. The grip assembly 414 includes a grip subassembly 420 and a proximal end segment 422 (e.g., proximal end plug or cap) and a distal end segment 424. The grip subassembly 420 can have the same construction as the grip subassembly 320, which will be described in more detail below. The proximal end segment 422 and distal end segment 424 can be formed of EVA or another suitable material. The proximal and distal end segments 422, 424 close the ends of the grip subassembly 420. Optionally, EVA can be provided inside the grip subassembly and extend from the proximal end segment to the distal end segment. Other configurations of grip subassemblies can be used without departing from the scope of the present disclosure.

The reel seat assembly 416 includes a reel seat body 416A supporting proximal and distal reel receivers 416B, 416C (e.g., hoods) configured to receive opposite end portions of a reel foot to mount the reel on the fishing pole 410. The proximal reel receiver 416B is static with respect to the reel seat body 416A, and the distal reel receiver 416C is movable with respect to the proximal reel receiver 416B to change a distance therebetween to permit installation of the reel foot. The distal receiver 416C is moved by rotation of an actuator 416D (e.g., nut) having a threaded connection with the reel seat body 416A. A finger rest 416E protrudes downward from the reel seat body 416A below the proximal reel receiver 416B. Other configurations of reel seats can be used without departing from the scope of the present disclosure.

Figure 12:
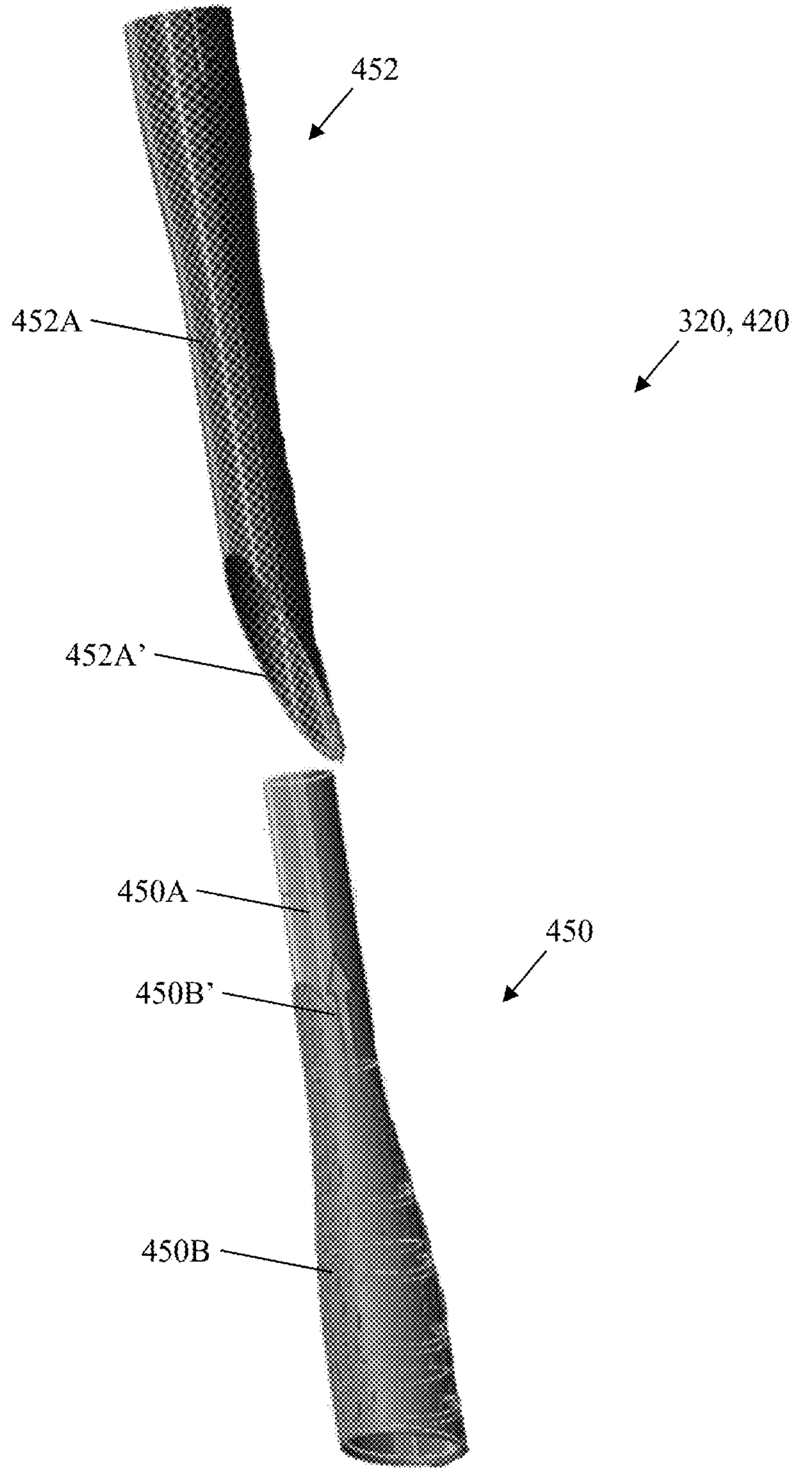
FIG. 12 is an exploded perspective of components of a fishing pole grip subassembly used to manufacture the fishing pole grips of the third and fourth fishing poles.
Figure 13:
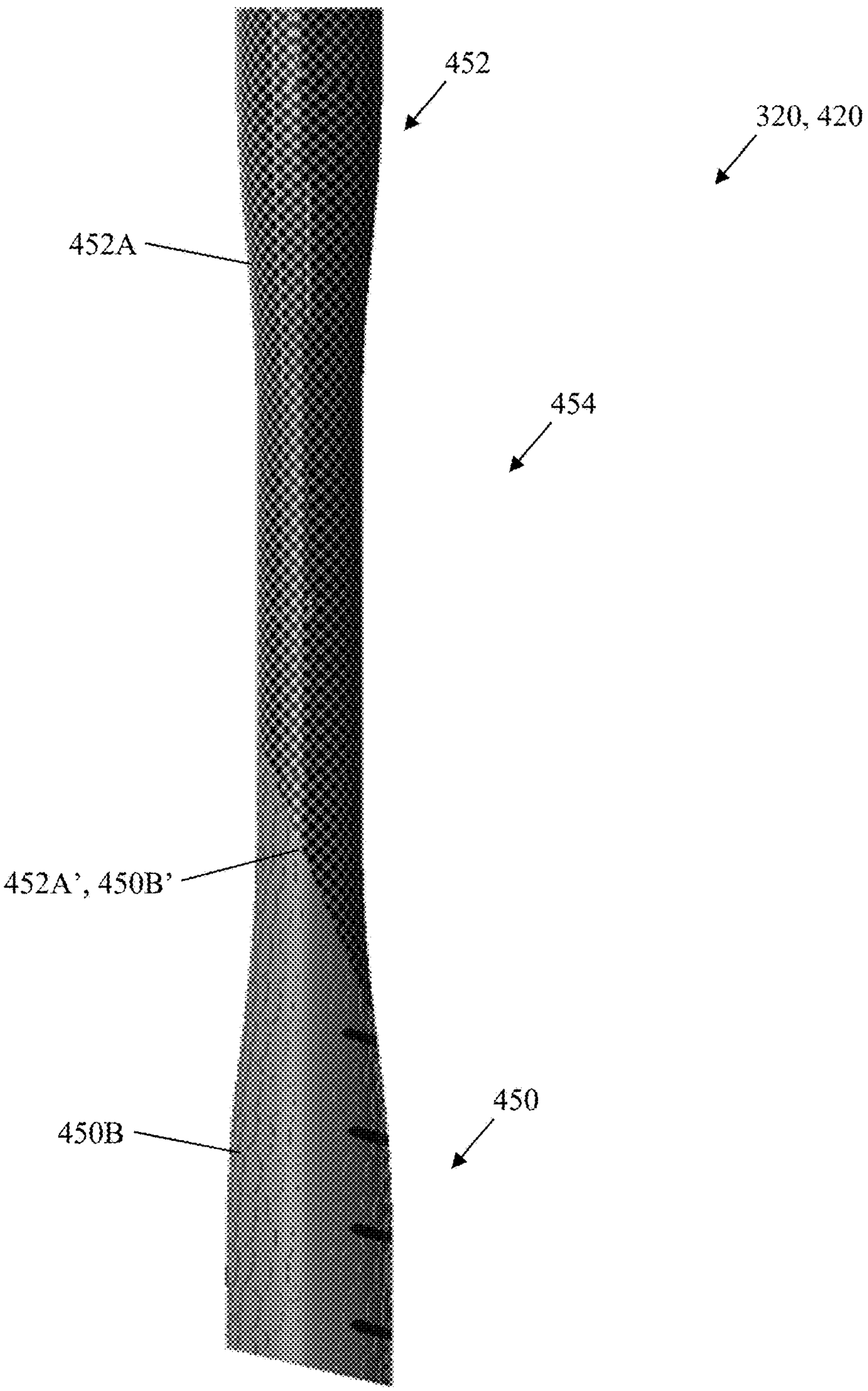
FIG. 13 is a right side elevation of the fishing pole grip subassembly of FIG. 12.
Figure 14:
FIG. 14 is a section of the fishing pole grip subassembly of FIG. 12.

Referring now to FIGS. 12-14, the grip subassembly 320,420 comprises a proximal (first) grip component 450 and a distal (second) grip component 452. The proximal grip component 450 includes an inner shell 450A having a layer of TPE or silicone material 450B (or other suitable material) overmolded thereon. The distal grip component 452 comprises a carbon fiber tube 452A. The distal grip component 452 can be made of other materials without departing from the scope of the present disclosure. In one method of assembly, after the material 450B is overmolded onto the inner shell 450A to form the proximal grip component 450, then the distal grip component 452 is installed over the shell 450A to locate a proximal end of the carbon fiber tube 452A to abut and be generally flush with the overmolded material 450B. The construction integrates a carbon fiber section with an overmolded section to form a composite cover 454 that provides a desirable grip feel and ornamental appearance. The overmolded material 450B and carbon fiber tube 452A hide the inner shell 450A from view. The EVA end segments are installed on opposite ends of the grip subassembly 320, 420 for closing the opposite ends of the subassembly. The grip assembly 314, 414 (comprising the shell, cover, and end segments) is installed onto the shaft 312, 412.

The inner shell 450A can be formed of plastic (e.g., injection molded polymer). After the inner shell 450A is formed, the first cover portion (e.g., the TPE or silicone portion) is overmolded onto the shell 450A. The overmolded portion 450B is formed to have a tapered distal edge 450B'. The carbon fiber section 452 is formed (e.g., molded and cured) to have a smaller proximal end 452A' that tapers to complement the tapered distal edge 450B' of the overmolded portion 450B. The proximal end 452A' of the carbon fiber section 452A has a proximal opening for receiving the inner shell 450A. The carbon fiber section 452A is received over the shell such that the proximal end 452A' of the carbon fiber 452A lies adjacent or abuts the tapered distal edge 450B' of the overmolded portion. The complementary edges of the overmolded portion 450B and carbon fiber section 452A form a joint behind which the inner shell 450A is hidden. The carbon fiber section can be secured in place by adhesive or another suitable type of bonding (e.g., to the inner shell). The shell and overmolded portion have a larger proximal end than distal end, and the carbon fiber section has a larger distal end than proximal end. The arrangement is such that the grip subassembly forms a generally hourglass shape having an intermediate portion of lesser diameter. Other configurations (e.g., other shapes) can be used without departing from the scope of the present disclosure.

Figure 15:
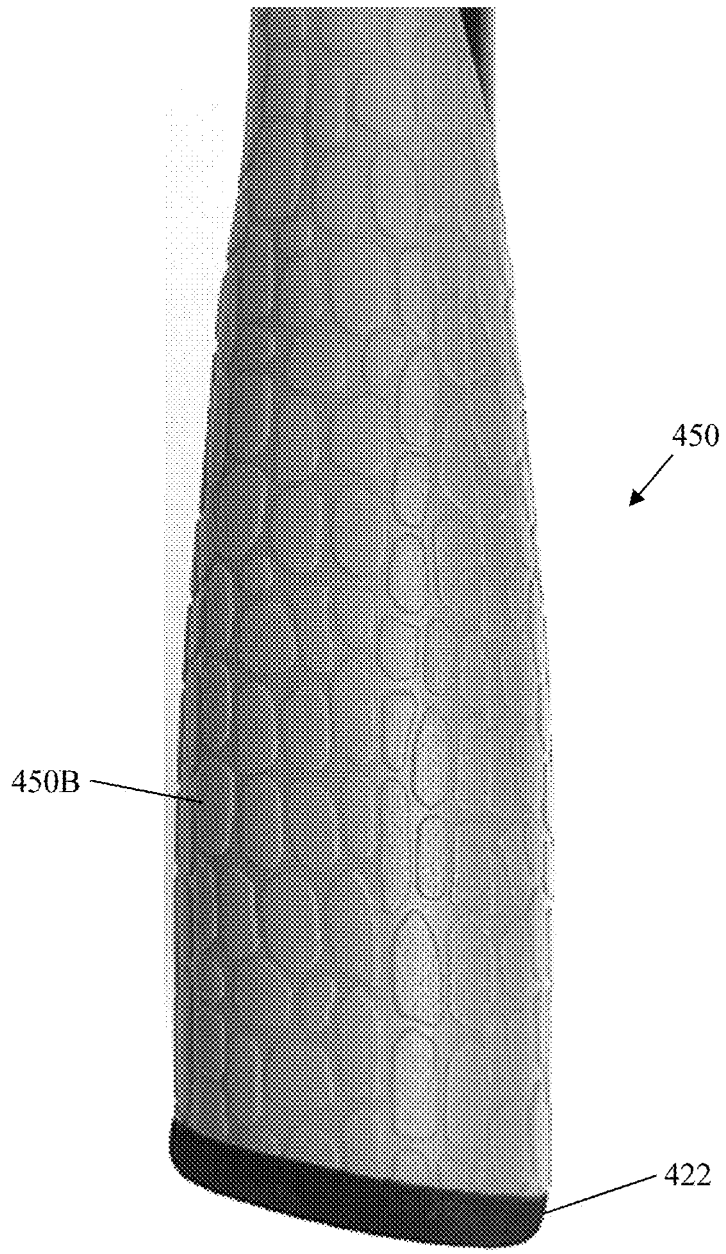
FIG. 15 is an enlarged fragmentary right elevation of the fishing pole of FIG. 11.

It will be appreciated that the outer surfaces of the overmolded portion 450B and the carbon fiber portion 452A are generally flush at the joint therebetween to provide a smooth transition between the two materials. The arrangement is such that the grip subassembly 320, 420 has a composite construction that provides a user with a desirable overmolded gripping section and smooth surface carbon fiber section. As shown in FIG. 15, the overmolded portion 450B can have an outer surface texture, such as a "gator skin" texture, that provides enhanced friction and facilitates gripping the overmolded section. Although the overmolded portion itself is generally flexible and compressible, and thus needing the inner shell for support, the carbon fiber section is rigid and self-supporting, and relies on the inner shell primarily for connection to and maintaining position with respect to the overmolded portion. When the shell 450A is received on the shaft 312, 412 the shell 450A can be filled with a filler such as an expanding foam or other material (e.g., EVA) or mounting component(s). Other configurations can be used without departing from the scope of the present disclosure It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A fishing pole grip comprising:

a fishing pole grip subassembly including a shell and an overmolded layer, the fishing pole grip subassembly having a proximal end portion, a distal end portion, and an intermediate portion therebetween, the shell including a proximal shell component and a distal shell component, the proximal and distal shell components being formed separately and connected to form a joint between the proximal and distal shell components, the proximal and distal shell components forming a substantially hourglass shape such that the fishing pole grip assembly has a generally hourglass shape wherein the proximal and distal end portions are wider than the intermediate portion, the overmolded layer overlying the shell.

2. The fishing pole grip of claim 1, wherein the proximal and distal shell components are each tubular.

3. The fishing pole grip of claim 1, wherein the proximal shell component includes a projection extending into the overmolded layer.

4. The fishing pole grip of claim 1, wherein the distal shell component includes a projection extending into the overmolded layer.

5. The fishing pole grip of claim 1, in combination with a reel seat assembly, the reel seat assembly mounted to the distal end portion of the fishing pole grip subassembly.

6. The fishing pole grip of claim 1, wherein the proximal shell portion has a reduced diameter segment received by the distal shell portion to connect the proximal and distal shell portions together.

7. The fishing pole grip of claim 1, in combination with a fishing pole shaft, wherein the fishing pole shaft is supported by the fishing pole grip.

8. A fishing pole grip comprising:

a fishing pole grip subassembly including a shell, an overmolded layer, and a carbon fiber tube, the carbon fiber tube and the overmolded layer overlying the shell and forming a joint, the overmolded layer being in contact with the shell, wherein the fishing pole grip subassembly has an hourglass shape that includes a valley, and the joint between the carbon fiber tube and the overmolded layer is located in the valley.

9. The fishing pole grip of claim 8, wherein the carbon fiber tube forms a distal end portion of the fishing pole grip subassembly and the shell and overmolded layer form a proximal end portion of the fishing pole grip subassembly.

10. The fishing pole grip of claim 9, wherein the carbon fiber tube forms an exterior surface of the distal end portion of the fishing pole grip subassembly and the overmolded layer forms an exterior surface of the proximal end portion of the fishing pole grip subassembly.

11. The fishing pole grip of claim 8, wherein a proximal end of the carbon fiber tube and a distal end of the overmolded layer abut one another.

12. The fishing pole grip of claim 8, wherein the fishing pole grip subassembly has a longitudinal axis, the joint formed by the carbon fiber tube and the overmolded layer being tapered relative to the longitudinal axis.

13. The fishing pole grip of claim 9, in combination with a reel seat assembly, the reel seat assembly mounted to the distal end portion of the fishing pole grip subassembly formed by the carbon fiber tube.

14. The fishing pole grip of claim 8, wherein the joint has an ovoid perimeter.

15. The fishing pole grip of claim 9, wherein a distal end of the shell is spaced apart from a distal end of the carbon fiber tube in the proximal direction.

16. The fishing pole grip of claim 15, in combination with a reel seat assembly, the reel seat assembly being mounted to the distal end of the carbon fiber tube.

17. The fishing pole grip of claim 8, wherein the fishing pole grip subassembly has a longitudinal axis, the carbon fiber tube being arranged relative to the shell and the overmolded layer such that there is an imaginary plane taken normal to the longitudinal axis at a location along the longitudinal axis that is spaced apart from the shell and the overmolded layer.

18. The fishing pole grip of claim 17, wherein the imaginary plane only intersects the carbon fiber tube of the fishing pole grip subassembly.

19. The fishing pole grip of claim 8, wherein the carbon fiber tube is a distinct entity from the shell and is connected to the shell.

20. A fishing pole grip comprising:

a fishing pole grip subassembly including a shell, an overmolded layer, and a carbon fiber tube, the carbon fiber tube and overmolded layer overlying the shell and forming a joint, the carbon fiber tube forming a distal end portion of the fishing pole grip subassembly and the shell and overmolded layer forming a proximal end portion of the fishing pole grip subassembly, a distal end of the shell being spaced apart from a distal end of the carbon fiber tube in a proximal direction.

21. The fishing pole grip of claim 20, wherein the carbon fiber tube is a distinct entity from the shell and is connected to the shell.

22. The fishing pole grip of claim 20, in combination with a reel seat assembly, the reel seat assembly being mounted to the distal end of the carbon fiber tube.

23. The fishing pole grip of claim 20, wherein the fishing pole grip subassembly has a longitudinal axis, the carbon fiber tube being arranged relative to the shell and the overmolded layer such that there is an imaginary plane taken normal to the longitudinal axis at a location along the longitudinal axis that is spaced apart from the shell and the overmolded layer.

24. The fishing pole grip of claim 23, wherein the imaginary plane only intersects the carbon fiber tube of the fishing pole grip subassembly.

25. The fishing pole grip of claim 20, wherein the carbon fiber tube forms an exterior surface of the distal end portion of the fishing pole grip subassembly and the overmolded layer forms an exterior surface of the proximal end portion of the fishing pole grip subassembly.

26. The fishing pole grip of claim 20, wherein the joint has an ovoid perimeter.

27. The fishing pole grip of claim 20, wherein the fishing pole grip subassembly has an hourglass shape.

28. A fishing pole comprising:

a fishing pole grip subassembly including a shell, an overmolded layer, and a carbon fiber tube, the carbon fiber tube and the overmolded layer overlying the shell and forming a joint, the overmolded layer being in contact with the shell, the carbon fiber tube forming a distal end portion of the fishing pole grip subassembly, the shell and overmolded layer forming a proximal end portion of the fishing pole grip subassembly; and a reel seat assembly mounted to the distal end portion of the fishing pole grip subassembly formed by the carbon fiber tube.

29. The fishing pole of claim 28, wherein a distal end of the shell is spaced apart from a distal end of the carbon fiber tube in a proximal direction.

30. The fishing pole of claim 28, wherein the joint has an ovoid perimeter.

31. The fishing pole of claim 28, wherein a proximal end of the carbon fiber tube and a distal end of the overmolded layer abut one another.

32. The fishing pole of claim 28, wherein the fishing pole grip subassembly has an hourglass shape.

33. The fishing pole of claim 28, wherein the carbon fiber tube forms an exterior surface of the distal end portion of the fishing pole grip subassembly and the overmolded layer forms an exterior surface of the proximal end portion of the fishing pole grip subassembly.

34. The fishing pole of claim 28, wherein the fishing pole grip subassembly has a longitudinal axis, the joint formed by the carbon fiber tube and the overmolded layer being tapered relative to the longitudinal axis.

35. The fishing pole of claim 28, wherein the carbon fiber tube is a distinct entity from the shell and is connected to the shell.

36. A fishing pole grip comprising:

a fishing pole grip subassembly including a shell, an overmolded layer, and a carbon fiber tube, the carbon fiber tube and the overmolded layer overlying the shell and forming a joint, the overmolded layer being in contact with the shell, the fishing pole grip subassembly having a longitudinal axis, the carbon fiber tube being arranged relative to the shell and the overmolded layer such that there is an imaginary plane taken normal to the longitudinal axis that intersects the carbon fiber tube and is spaced apart from the shell and the overmolded layer.

37. The fishing pole grip of claim 36, wherein a proximal end of the carbon fiber tube and a distal end of the overmolded layer abut one another.

38. The fishing pole grip of claim 36, wherein the carbon fiber tube forms a distal end portion of the fishing pole grip subassembly and the shell and overmolded layer form a proximal end portion of the fishing pole grip subassembly.

39. The fishing pole grip of claim 38, further comprising a reel seat assembly mounted to the distal end portion of the fishing pole grip subassembly formed by the carbon fiber tube.

40. The fishing pole grip of claim 36, wherein the fishing pole grip subassembly has an hourglass shape.

41. The fishing pole grip of claim 38, wherein the carbon fiber tube forms an exterior surface of the distal end portion of the fishing pole grip subassembly and the overmolded layer forms an exterior surface of the proximal end portion of the fishing pole grip subassembly.

42. The fishing pole grip of claim 36, wherein the fishing pole grip subassembly has a longitudinal axis, the joint formed by the carbon fiber tube and the overmolded layer being tapered relative to the longitudinal axis.

43. The fishing pole of claim 36, wherein the carbon fiber tube is a distinct entity from the shell and is connected to the shell.

* * * * *